Aug. 12, 1952
G. R. BLACKMAN ET AL
STRAINER FOR PIPE LINES AND
MEANS FOR CLEANING THE SAME
2,606,663
Filed May 24, 1950
2 SHEETS—SHEET 1
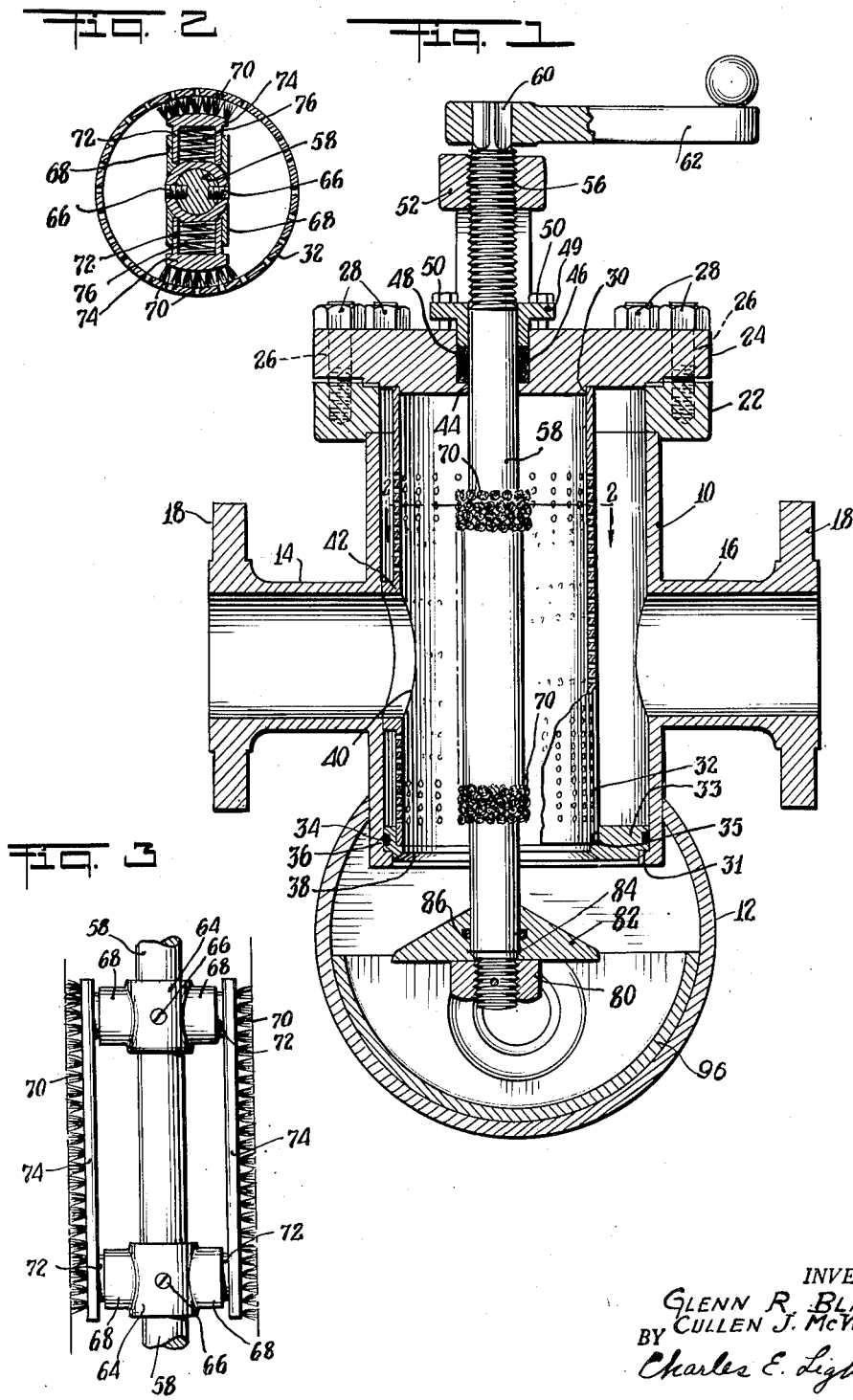
INVENTORS
GLENN R. BLACKMAN
CULLEN J. McWHORTER
BY Charles E. Lightfoot
ATTORNEY

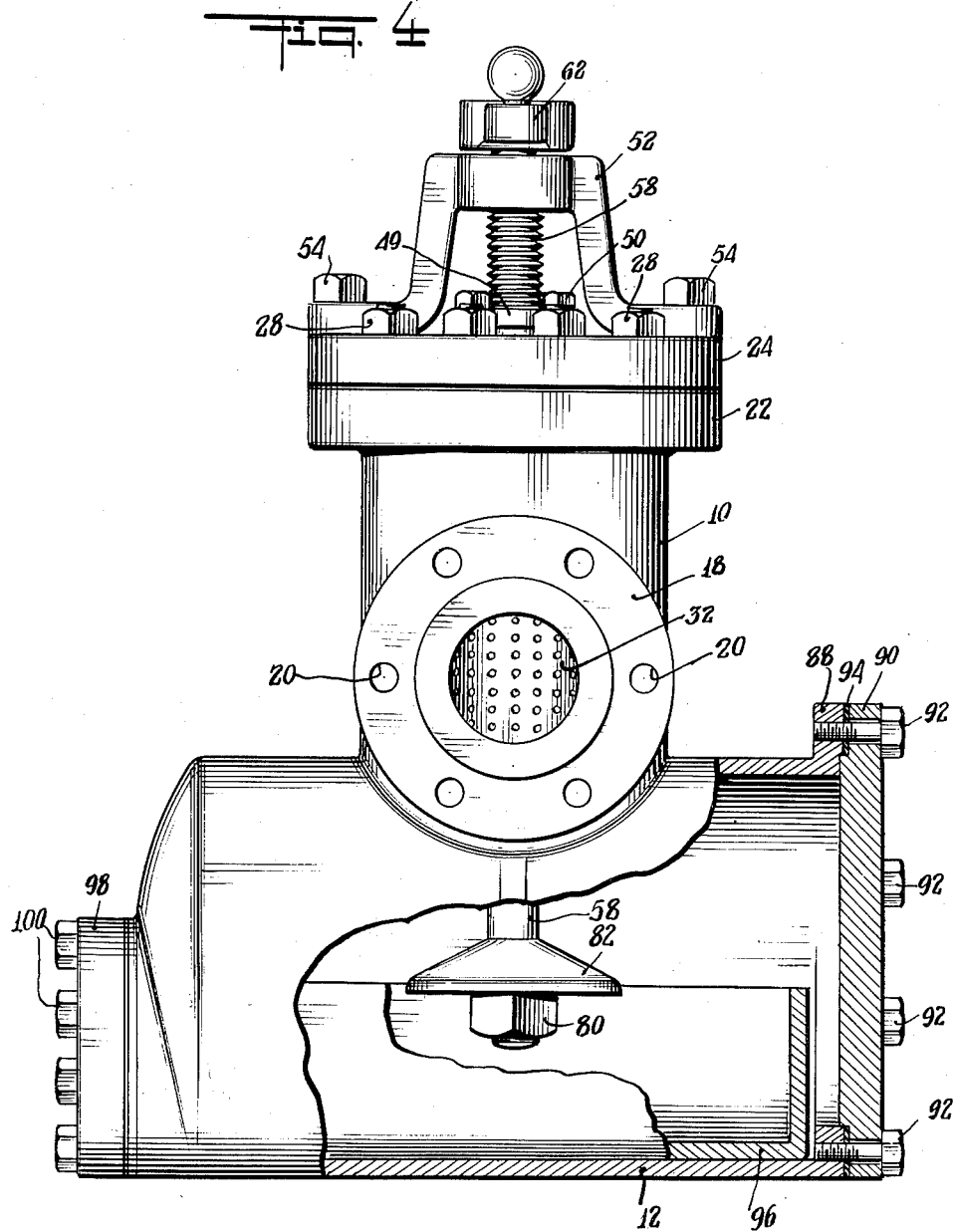

Patented Aug. 12, 1952

2,606,663

UNITED STATES PATENT OFFICE 2,606,663

STRAINER FOR PIPE LINES AND MEANS FOR CLEANING THE SAME

Glenn R. Blackman and Cullen J. McWhorter, South Houston, Tex.

Application May 24, 1950, Serial No. 163,866

4 Claims. (Cl. 210—166)

This invention relates to a strainer for pipe lines and means for cleaning the same, and more particularly to a strainer structure adapted to be applied to pipe lines or the like which must be kept in continuous flowing condition and where inconvenience or expense would result from clogging or malfunctioning of the strainer necessitating closing the pipe line.

The invention is especially adaptable for use in pipe lines, such as oil lines, wherein it is frequently essential or desirable to prevent deleterious matter, such as dirt, sand, or other debris carried in the fluid flowing through the pipe, from entering the system to which the pipe line leads. Numerous types of straining or filtering devices have been used heretofore in pipe lines for various purposes, and provisions has frequently been made for cleaning the same when clogged or when the deleterious matter thereon has accumulated to such a degree as to seriously affect the flow of fluid. Such devices, as customarily employed in the past, however possess several undesirable disadvantages, in that it has usually been necessary to discontinue the flow of fluid through the device preparatory to cleaning the same, and the pipe line must then be disconnected to remove the accumulated deleterious matter, before the device can be restored to effective operation. Such closing of the pipe line and disconnection of the same results not only in high labor cost in the maintenance of the line, but also in great loss of time, and in case of a sudden stoppage in the flow through the strainer causes expensive shutdowns in the operation of the system served by the line.

This invention has for its chief object, therefore, to provide a self cleaning strainer for use in the location indicated, which may be maintained in efficient operating condition at all times, which is not subject to the above mentioned disadvantages, and by the use of which expensive by-passes or duplication of pipe lines to permit dismantling of the device is avoided.

Another object of the invention is the provision of a self-cleaning strainer of the type referred to having means for retaining the deleterious material removed from the strainer and means whereby the device may be opened to remove such material therefrom when it has accumulated therein, without loss of fluid from the pipe line and without interference with the flow of fluid therethrough.

A further object of the invention is the provision of a strainer device for use in pipe lines which includes means for preventing damage to the cleaning mechanism due to the lodging therein of large particles or pieces of debris, and also permitting continued operation of the device until such debris can be removed.

The invention also contemplates the provision of a straining device of the kind referred to wherein the parts are easily accessible and are arranged to be readily removed and replaced for purposes of repair without dismantling the entire structure or removing the same from the pipe line.

A still further object of the invention is to provide a straining device for use in pipe lines which is of simple design and rugged construction having few parts subject to wear, and which is capable of withstanding the extreme conditions of exposure and continued use to which such devices are customarily subjected.

The invention will best be understood from the following detailed description constituting a specification of the same, when considered in conjunction with the annexed drawings, wherein—

Figure 1 is a vertical, central, cross-sectional view of the invention;

Figure 2 is a cross-sectional view taken along the line 2—2 of Figure 1, looking in the direction indicated by the arrows;

Figure 3 is a fragmentary side elevational view, showing the cleaning brushes of the invention, separated from the body of the structure; and Figure 4 is a side elevational view of the invention, partly broken away to show the relationship of the interior parts of the same.

Referring now to the drawings in greater detail, wherein like numerals are used to indicate the same or similar parts throughout the several views, the casing of the strainer device may conveniently be formed of cast construction, having an upper, cylindrical, vertically disposed casing portion, or chamber, 10 surmounting a lower cylindrical horizontally disposed casing portion, or chamber, 12. The casing portion 10 may be formed with outwardly extending inlet and outlet pipe connections 14 and 16 provided at their outer ends with flanges 18, for convenient attachment to similar connecting means on the ends of pipe sections of the line into which the device is to be placed, and secured thereto by bolts passing through openings 20, or otherwise.

The casing portion 10 has an outstanding flange 22 at its upper end adapted to receive a cap plate 24 thereon and secured thereto by stud bolts 26 having nuts 28 thereon.

A circular shouldered portion 30 is formed beneath the cap plate 24, upon which a tubular strainer 32 in the form of a cylindrical foraminous screen is seated for disposition in the casing portion 10. This screen is desirably made of a durable material such as brass or other metal having high wear resisting qualities, yet sufficiently cheap to be inexpensively replaceable. At the lower end of the casing portion 10, which end opens into the portion 12, an internal shoulder 31 is formed, upon which a ring-like bushing 33 is positioned, which bushing has a recess 35 therein forming a seat for the lower end of the strainer 32. The bushing has a peripheral groove 34 in which suitable packing material 36 may be disposed to form a seal between the casing portion 10 and the bushing, and a downwardly facing valve seat 38 is formed on the bushing for a purpose later to be made apparent.

It will be seen from an inspection of Figure 1 that when the screen is in position on the bushing and the cap plate is secured in place the bushing will be held securely on its seat in the casing.

The cylindrical screen has an opening 40 at one side surrounded by an outwardly projecting rim 42, which matches the size of the connections 14 and 16 and may be brought into registration therewith to permit the flow of fluid to the inside of the screen, so that it must pass through the screen in order to flow through the pipe line.

As best seen in Figure 1, the shouldered portion 30 of cap plate 24, and the seat 35 in the bushing 33, are disposed eccentrically of the cylindrical casing portion 10, so that the cap and bushing may be rotated 180° from the positions shown, and the strainer thereupon also rotated 180° to bring the opening 40 thereof into registration with the connection 16, should it be necessary or expedient to reverse the flow of fluid in the pipe line.

The cap plate 24 has an opening 44 therethrough, which is eccentric with respect to the cap plate, but concentric with respect to the strainer 32, and about this opening is a stuffing box 46 having the packing 48 therein, adapted to be compressed by a retainer 49. The retainer 49 is shown secured by bolts 50 to the cap plate for adjustment in the stuffing box, but it is to be understood that the same could be provided with a hexagonal flange and secured in the box by screw threading or otherwise. There is a yoke 52 mounted on top of the cap plate by suitable means such as the bolts 54, this yoke being provided with a screw threaded opening 56 therein for the reception of a shaft 58, extending through the yoke and stuffing box and downwardly into the casing. The shaft 58 has a threaded upper end terminating in a squared portion 60 upon which an operating handle 62 is positioned for rotating the shaft.

Within the casing portion 10 the shaft 58 carries spaced brush supports 64, secured thereto by set screws 66 or otherwise. The brush supports 64 may be sleeve-like in formation with outstanding cylindrical portions 68 thereon, in which brushes 70 are moveably positioned by cylindrical extensions 72 attached to the backs 74 of the brushes. Resilient members 76 are located inside the extensions 72, which bear on the brush supports and are effective to urge the brushes outwardly into engagement with the inside surface of the strainer 32. The bristles of the brushes may desirably be formed of durable and relatively non-corrosible material such as stainless steel, whereby they are capable of withstanding long exposure to the influence of relatively corrosive fluids.

Shaft 58 extends below the casing portion 10 into the portion 12 and has its lower end threaded to receive a nut 80, by which a valve body 82 is retained on the shaft by engagement with a shoulder 84 thereon. Suitable packing 86 is disposed between the valve 82 and the shaft to prevent leakage therebetween when the valve is closed on the seat 38.

The lower, horizontally disposed casing portion 12 has a thickened peripheral portion 88 at one end, which end is closed by a closure 90 secured in place by screw bolts 92 or the like. A gasket 94 is positioned beneath the closure 90 between the same and the portion 88 to prevent leakage from this end of the casing. Within the casing portion 12 a receptacle 96 of suitable shape is disposed to receive material passing downwardly from the strainer 32 through the valve seat opening. This receptacle is preferably of a size to be conveniently removed from the casing by detaching the closure 90, in order to empty the receptacle.

A closure 98 may also be provided at the other end of the portion 12 of the casing, and secured thereto by bolts 100, which closure may be removed for purposes of cleaning the interior of the casing or for access to the valve 82.

The invention as described above is employed by connecting the same into the pipe line by means of the flanges 18 of the connections 14 and 16. In operation the fluid from the pipe line may flow into the connection 14, and into the cylindrical strainer through the opening 40 therein. The fluid then passes through the strainer and out through the connection 16 to the pipe line, any particles in the fluid which are larger than the openings in the strainer being retained therein.

For the purpose of cleaning the strainer 32, the shaft 58 is rotated by the handle 62, which causes the brushes 70 to rotate in contact with the strainer to remove deleterious matter from the inside of the strainer and keep the perforations thereof open. It will be noted that upon rotation of the shaft 58 in one direction the same will be moved upwardly due to the screw threads 56 on the shaft passing through the yoke 52, and the brushes will thereby be moved longitudinally of the strainer, as well as rotating in contact therewith, thus securing more effective cleaning of the strainer. At the same time the valve 82 moves upwardly with the shaft 58 into seating engagement with the valve seat 38, closing off the casing portion 12 from the portion 10. Upon rotation of the shaft 58 in the other direction the shaft moves downwardly carrying with it the brushes, which thus pass again longitudinally over the inside of the strainer, and the valve 82 is also opened. By thus rotating the shaft, first in one direction and then in the other, as far as it can be turned, a thorough cleaning of the strainer is effected, and the material removed therefrom is deposited in the receptacle 96. The rotation of the shaft may, of course, be accomplished in any suitable way, instead of by means of the handle 62, such as by attaching a reversible electric motor to the upper end of the shaft.

In the event that relatively large particles of foreign matter, pieces of debris, or the like should enter the strainer and become lodged therein, the brushes may move inwardly by compression of the resilient members 76, permitting the brushes to ride over such material without damage and still effectively perform their cleaning function on the strainer, until the obstructing material can be removed.

When it is desired to remove the receptacle 96, for emptying the same, the valve 82 is closed on the seat 38, by rotation of the shaft 58, thus sealing off the casing portion 12 from the pipe line. The closure 90 can then be taken off and the receptacle removed, without interrupting the flow through the pipe line, and without loss of fluid therefrom.

In the event it becomes necessary to dismantle the strainer device for purposes of repair or replacement of parts, the flow through the pipe line can be temporarily shut off, and the cap plate 24 removed, whereupon the entire working parts of the strainer can be removed at one time with the cap plate and either replaced immediately by a new assembly of such parts or quickly repaired and replaced.

It will thus be seen that the invention provides an efficient straining device for application to pipe lines and which can be maintained at all times in operative condition, whereby undesirable foreign matter, debris, and the like may be removed from the fluid passing through the line, and prevented from entering any kind of apparatus or system connected to the line which might be adversely affected by such material. The invention thus furnishes a simple solution to a difficult problem which has long confronted those skilled in the art, and for which no adequate solution has heretofore been available.

While the invention has been disclosed in connection with a specific embodiment of the same, it will be understood that this is intended to illustrate only, and that many changes can be made in the construction and arrangement of the various parts, without departing from the spirit of the invention or the scope of the appended claims.

Having thus clearly shown and described the invention, what is claimed as new and desired to secure by Letters Patent is:

1. A strainer for use in pipe lines comprising a casing, an upper chamber and a lower chamber in said casing, said upper chamber having inlet and outlet connections for connecting the same into a pipe line, said upper chamber having an opening in communication with said lower chamber, a tubular foraminous member in said upper chamber and having an aperture in communication with said inlet connection, said member being movable to a position in which said aperture is in communication with said outlet connection, said member having an open end in communication with said lower chamber through said opening in said upper chamber, a shaft mounted on said casing and extending through said upper chamber within said member and into said lower chamber, means cooperable with said shaft for simultaneously rotating said shaft and moving the same longitudinally, brush means carried by said shaft and movable therewith in said member in engagement with the inside of said member to clean the same, and closure means on said shaft in said lower chamber and moveable with said shaft to close said opening in said upper chamber.

2. A strainer for use in pipe lines comprising a casing, an upper cylindrical chamber and a lower chamber in said casing, said upper chamber having an inlet and an outlet, connecting means in communication with said upper chamber through said inlet and said outlet for connecting said casing into a pipe line, said upper chamber having an opening in its lower end in communication with said lower chamber, a tubular foraminous member of smaller diameter than said upper chamber in said upper chamber, said member having an aperture therein and also having an open lower end in communication with said lower chamber through said opening in said upper chamber, means mounting said member eccentrically in said upper chamber with said aperture in communication with said inlet, said means being movable to position said member with said aperture in communication with said outlet, a shaft mounted on said casing and passing eccentrically through said mounting means and extending concentrically through said member and into said lower chamber, means cooperable with said shaft for rotating said shaft and moving the same longitudinally in said casing, brush means yieldably mounted on said shaft in said member in engagement with the inside of said member for cleaning the same, and closure means on said shaft in said lower chamber and movable with said shaft to close said opening in said upper chamber.

3. A strainer for use in pipe lines comprising a casing, an upper cylindrical chamber and a lower chamber in said casing, said upper chamber having inlet and outlet connections for connecting said casing into a pipe line, said upper chamber having an opening in its lower end in communication with said lower chamber, a tubular foraminous member of smaller diameter than said upper chamber in said upper chamber and in communication at its lower end with said lower chamber through said opening, said member having an aperture therein, means mounting said member eccentrically in said upper chamber, said means being movable to position said aperture in communication with either of said connections, a shaft mounted on said casing and extending concentrically through said member and into said lower chamber, means cooperable with said shaft for rotating said shaft and moving the same longitudinally in said casing, brush means yieldably mounted on said shaft for rotation and longitudinal movement with the shaft in said member in engagement with the inside of said member for cleaning the same, and closure means on said shaft in said lower chamber and movable with said shaft to close said opening.

4. A strainer for use in pipe lines comprising a casing, an upper cylindrical chamber and a lower chamber in said casing, said upper chamber having an inlet and an outlet, connecting means in communication with said upper chamber through said inlet and said outlet for connecting said casing into a pipe line, said upper chamber having an opening in its lower end in communication with said lower chamber, a tubular foraminous member of smaller diameter than said upper chamber in said upper chamber and communicating with said lower chamber through said opening, said member having an aperture therein and an external flange surrounding said aperture, means mounting said member eccentrically in said upper chamber, said means being movable to move said member to one position with said aperture in communication with said inlet and to another position with said aperture in communication with said outlet, said external flange being engageable with the inside of the upper chamber about said inlet when the member is in said one position and about said outlet when the member is in said other position, a shaft mounted on said casing and extending concentrically through said member and into said lower chamber, means cooperable with the shaft for rotating the shaft and moving the same longitudinally in said casing, brush means mounted on said shaft in said member in engagement with the inside of said member for cleaning the same, and closure means on said shaft in said lower chamber and movable with said shaft to close said opening.

GLENN R. BLACKMAN.
CULLEN J. McWHORTER.

REFERENCES CITED

The following references are of record in the file of this patent:

UNITED STATES PATENTS

| Number | Name | Date |
|---|---|---|
| 1,102,791 | Overly | July 7, 1914 |
| 1,510,863 | Rose | Oct. 7, 1924 |
| 2,065,263 | Beldam | Dec. 22, 1936 |